United States Patent

[11] 3,607,817

[72] Inventors Louis E. Trapasso
Westfield;
Charles L. Smart, Millington, both of N.J.
[21] Appl. No. 621,762
[22] Filed Mar. 9, 1967
[45] Patented Sept. 21, 1971
[73] Assignee Celanese Corporation
New York, N.Y.

[54] PRODUCTION OF DYEABLE POLYACRYLONITRILE COMPOSITIONS AND ARTICLES
15 Claims, No Drawings

[52] U.S. Cl. ................................................. 260/32.6,
260/30.4, 260/30.8, 260/41, 260/79.3, 260/80.73,
260/80.75, 260/80.81
[51] Int. Cl. .................................................... C08f 15/40,
C08f 29/56, C08f 37/18
[50] Field of Search ........................................... 260/898,
32.6, 79.7, 79.3 M, 80.81, 80.73, 80.76

[56] References Cited
UNITED STATES PATENTS

| | | | |
|---|---|---|---|
| 3,366,711 | 1/1968 | Mazzolini | 260/79.3 M |
| 3,328,333 | 6/1967 | Dannelly | 260/79.3 M |
| 3,180,857 | 4/1965 | Conciatori | 260/79.3 M |
| 2,974,123 | 3/1961 | Ketterer | 260/79.3 M |
| 2,601,256 | 6/1952 | Bruson | 260/79.3 M |
| 3,123,588 | 3/1964 | Lunney | 260/79.3 M |
| 3,321,450 | 5/1967 | Hartmann | 260/79.3 M |

*Primary Examiner*—Morris Liebman
*Assistant Examiner*—P. R. Michl
*Attorneys*—T. J. Morgan, S. D. Murphy and Louis Gubinsky ABSTRACT: Dyeable (especially cationic-dyeable) acrylonitrile (AN) compositions and articles (e.g., films and filaments) are produced from blends of (I) a particular ternary or higher multi-component AN polymer and (II) a copolymer of vinyl acetate and N,N-dimethylacrylamide wherein the latter constitutes from 1 to 90 percent by weight of the said copolymer. The polymer of (I) contains at least three different copolymerized monomers of the kind and in average percent mers, based on the total number of mers from individual monomers employed in making the copolymer, as follows:

(A) from 85 to 99 percent AN;
(B) from 1 to 14.5 percent of
 (a) a vinylidene halide, or
 (b) a dye diffusion-promoting, ethylenically unsaturated monomer that is copolymerizable with the other components of the copolymer, e.g., vinyl acetate, acrylic and methacrylic acids, methacrylonitrile, methacrylamide, N-isooctylacrylamide, N,N-dimethylacrylamide, diacetone acrylamide and the monoallylether of trimethylolpropane, and
(C) from 0.15 percent to about 2 percent of a water-soluble salt of an organic sulfonic acid, e.g., vinylsulfonic, allylsulfonic, methallylsulfonic acids, and especially organic sulfonic acids wherein the sulfo group is separated from the ethylenic unsaturation by at least three carbon atoms, e.g., styrenesulfonic acid.

The total of (A), (B), and (C) is 100 percent.

The amount of the copolymer of (II) that is blended with the AN polymer of (I) is, for example, from 2-15 wt. percent of the total of (I) and (II).

The components may be dry-blended, but are preferably blended while dissolved in a common solvent, e.g., dimethylacetamide. The solutions can be cast to form cationic-dyeable films or wet-spun to form cationic-dyeable filamentary materials and other shaped articles.

PRODUCTION OF DYEABLE POLYACRYLONITRILE COMPOSITIONS AND ARTICLES

This invention relates broadly to the art of making dyeable polymers and shaped polymeric articles, and more particularly to technique whereby, in accordance with a preferred embodiment of the invention, the cationic dye-receptivity of certain ternary or higher multicomponent polymers of acrylonitrile (AN) is materially increased. The scope of the invention includes composition, article and method features.

The invention is based on our discovery that terpolymers of acrylonitrile wherein the acrylonitrile predominates and which contain a small amount of a water-soluble salt of an ethylenically unsaturated organic sulfonic acid as an integral part of the terpolymer molecule are improved in their receptiveness toward cationic dyes by blending with a particular dye-diffusion promoter, namely, a copolymer of vinyl acetate and dimethylacrylamide (N,N-dimethylacrylamide).

It is known that homopolymeric acrylonitrile and copolymers of acrylonitrile into which no dye sites have been introduced chemically (i.e., as an integral part of the polymer molecule) or by blending with a polymer containing dye sites are extremely difficult to dye satisfactorily with conventional acid and basic dyes. Various and sundry means have been suggested and are in use for overcoming or minimizing the problem of dyeing acrylonitrile polymers effectively and economically without adversely affecting the other useful and/or commercially desirable properties of shaped articles (e.g., films, filaments, etc.) fabricated from the polymer. The present invention is a different solution to the problem of dyeing acrylonitrile copolymers and which has certain advantages over the prior art techniques.

Accordingly, it is one of the primary objects of the present invention to provide means for rendering cationic dye-receptive those acrylonitrile polymerization products that either lack completely or are deficient in receptiveness to cationic dyes.

Another object of the invention is to provide cationic dye-receptive compositions comprising blends of an acrylonitrile polymer of the kind broadly described in the preceding paragraph and a particular dye opener (also known as a dye-diffusion promoter), which compositions can be spun, cast or otherwise shaped to form filaments (monofilaments or multifilaments), films, rods, tubes, bars, ribbons, tapes, sheets, yarns, tows and the like, and the shaped articles then dyed either before or after having been oriented (e.g. by stretching) and/or made into fabrics in knitted, woven, felted or other form.

Another object of the invention is to provide new acrylonitrile multicomponent polymers, especially terpolymers, which are useful in making the blends described in the preceding paragraph.

Still other objects of the invention are to provide methods of making the new compositions and shaped articles of the invention.

Other objects of the invention will be apparent to those skilled in the art from the description and examples that follow.

In general, the objects of the invention are attained by forming a multicomponent polymer, specifically a terpolymer, of (a) acrylonitrile, (b) an ethylenically unsaturated (usually monoethylenically unsaturated) monomer which is a dye-diffusion promoter (DDP) and is copolymerizable with acrylonitrile, and (c) a water-soluble salt of an organic sulfonic acid. In some cases it may be advantageous for economic or other reasons to omit the DDP of (b) in which case a binary polymer of the monomers of (a) and (c) is formed. Or, the terpolymer can be formed of (A) acrylonitrile, (B) a vinylidene halide, e.g., vinylidene chloride or bromide, and (C) a water-soluble salt of the kind defined under (c), supra. Unlike the ethylenically unsaturated monomer of (b), supra, the vinylidene halide of (B) in this last-described terpolymer does not function as a dye opener or dye-diffusion promoter. In fact, when a vinylidene halide is copolymerized with styrenesulfonic acid or terpolymerized with acrylonitrile and styrenesulfonic acid, the resulting polymers are cationic dye-resistant.

In accordance with one embodiment of this invention, and which is usually the preferred embodiment, the above-described terpolymers are blended with a particular dye-diffusion promoter, namely, a copolymer of vinyl acetate (VA) and dimethylacrylamide (DMA).

Illustrative examples of the DDP monomers of (b) are vinyl acetate, methyl acrylate, dimethylacrylamide, methacrylamide, N-isooctylacrylamide, monoallylether of trimethylolpropane, vinyl versatate (vinyl neodecanoate), the formula for which is

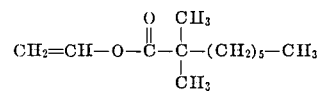

and diacetone acrylamide, the formula for which is

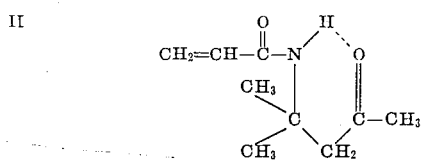

The monomers of (a) and (b) or of (A) and (B), supra, are copolymerized along with a sufficient amount of the water-soluble salt of the ethylenically unsaturated organic sulfonic acid, i.e., (c) or (C), supra, to produce a terpolymer containing about 0.15 to about 2 mole percent of the said salt. Lower proportions ordinarily do not effect a sufficiently pronounced improvement in cationic dyeability while a higher amount than that indicated generally results in a terpolymer that is sensitive to hot water. Advantageously the proportions of the sulfonic component is less than about 1 mole percent, since the resulting terpolymer is then more useful for its intended purpose such as, for example, in blends with a VA-DMA copolymer to form improved cationic dye-receptive compositions. Preferably the proportion of the water-soluble sulfonate is within the range of from 0.15 to about 0.5 mole percent.

Illustrative examples of water-soluble salts of organic sulfonic acids that are useful in preparing the above-described terpolymers include the water-soluble salts, more particularly the alkali-metal salts and especially the sodium and potassium salts of organic sulfonic acids including, for example, vinylsulfonic, allylsulfonic and methallylsulfonic acids. Particularly useful are the water-soluble salts of organic sulfonic acids wherein the sulfo group is separated from the ethylenic unsaturation by at least three carbon atoms, e.g., styrenesulfonic acids such as the ortho-, meta- and para-styrene sulfonic acids, as well as commercial mixtures thereof; ortho-, meta- and para-sulfomethylstyrenes, mixtures thereof; and substitution products thereof such as poly-sulfo derivatives as well as beta-sulfoethyl methacrylate (isothionic acid ester of methacrylic acid); and the like.

The different mers from the monomers of (a), (b) and (c), as well as of (A), (B) and (C), supra, collectively designated below, respectively as (1), (2) and (3), are present in the individual terpolymer in average percentage values, based on the total number of mers from individual monomers employed in making the terpolymer, within the following ranges:

1. from 85 percent to 99 percent, more particularly [especially when making the terpolymers of (a), (b) and (c)] from 90 percent to 98 percent;
2. from 1 percent to 14.5 percent, more particularly [especially when making the terpolymers of (a), (b) and (c)] from 3 percent to 10 percent; and
3. from 0.15 percent to 2 percent, preferably from 0.15 to 0.5 percent, the total of (1), (2) and (3) being 100 percent.

The acrylonitrile terpolymer is prepared in known manner, using bulk, solution, suspension or emulsion polymerization techniques, and preferably with the aid of some form of catalytic influence including heat, light, irradiation, catalysts or various combinations thereof as desired or as conditions may require.

Any of the catalysts, especially those of the so-called "free radical" type, commonly employed in polymerizing compounds containing an ethylenically unsaturated grouping, specifically a vinyl grouping, can be used. Such catalysts include the various organic and inorganic peroxy compounds, more particularly the organic peroxides, e.g., tert.-butyl hydroperoxide; the salts of inorganic per-acids, e.g., ammonium persulfate, sodium persulfate and potassium persulfate; the azo-type catalysts, e.g., alpha, alpha'-azodiisobutyronitrile; and the various redox-catalyst systems, e.g., ammonium or potassium persulfate and sodium metabisulfite, sodium chlorate and sodium sulfite, as well as others known in the art.

For additional details on polymerization techniques generally applied in preparing the copolymers involved in this invention, reference is made to U.S. Pat. No. 3,180,857 of Conciatori and Smart dated Apr. 27, 1965, and assigned to the same assignee as the present invention, especially column 5, lines 17–73 thereof, and wherein methods for the preparation of certain copolymers, more particularly terpolymers, of vinylidene cyanide are described.

The vinyl acetate-dimethylacrylamide copolymer that is used as a blending agent in accordance with a preferred embodiment of the present invention can contain from 1 to 90 percent, more particularly from about 30 to about 70 percent by weight of dimethylacrylamide. It is prepared by bulk, emulsion, suspension or solution polymerization techniques.

In producing the blended compositions of this invention the VA-DMA copolymer blending agent is blended with the cationic dye-receptive terpolymer in such proportions that the former imparts increased cationic dye-receptivity to the latter, the net result being that the blended product becomes more cationic dye-receptive than is the terpolymer alone.

The proportions of the respective components of the blend may be considerably varied, but usually the VA-DMA blending agent constitutes, by weight, from about 2 or 3 percent to about 15 percent, preferably from about 5 percent to about 10 percent, of the total amount of the terpolymer and the blending agent.

In general, the higher amounts of copolymer blending agent are employed in the blend when the terpolymer contains a comonomer with acrylonitrile and the sulfonate salt, which comonomer is not a dye-diffusion promoter; that is, a comonomer such as a vinylidene halide, specifically vinylidene chloride.

Any suitable method of blending the VA-DMA blending agent and the terpolymer to form a substantially homogeneous composition may be employed. For example, the finely divided solids may be dry-blended together using commercially available mixing equipment, or they may be dissolved in a common solvent and admixed in solution (including dispersed) state. Usually the latter method is preferred. The solvent should be one in which both the acrylonitrile terpolymer and the VA-DMA copolymer are soluble (substantially soluble) at least at the application temperature, more particularly at the extrusion temperature when the solution is to be extruded through an opening to form filaments, films or the like. To the best of our knowledge and belief any solvent for homopolymeric acrylonitrile will also function as a solvent for the binary and ternary polymeric components of the blend.

Suitable solvents, more particularly organic solvents, for making solution blends of the VA-DMA blending agent and the acrylonitrile terpolymer are disclosed in U.S. Pat. Nos. 2,404,713–728 directed to organic-solvent solutions of homopolymeric acrylonitrile and copolymers of at least 85 percent by weight of acrylonitrile with another monomer, and to the use of such solutions in making films, filamentary materials and the like. Specific examples of organic solvents that may be employed in making such blends are dimethylformamide, dimethylacetamide, dimethylsulfoxide, dimethylsulfone, ethylene thiocyanate, trimethylene thiocyanate, ethylene carbonate and propylene carbonate.

In the preferred technique for effecting solution blending, the VA-DMA copolymer is added to a solution of the acrylonitrile terpolymer. The dissolution of this terpolymer in the solvent, more particularly an organic solvent, is accelerated by using a polymer that is in finely divided state, e.g., one which, if not in finely divided state as originally formed, has been ground so that all or substantially all of it will pass through a U.S. Standard Sieve Series No. 50 screen. It is also usually desirably to agitate the mass, as by mechanical stirring, while dissolving the polymer in the solvent. To avoid or minimize discoloration of the acrylonitrile terpolymer, it is also desirable to employ the lowest possible temperature in effecting dissolution thereof that is consistent with practical considerations, e.g., the time required for effecting solution, etc. Dissolution temperatures below about 100° C. are advantageous, and preferably the maximum temperature of dissolution is kept within the range of 60°–90° C. providing the solvent is a liquid at that temperature; otherwise, at the lowest temperature that will liquify the solvent and maintain it in liquid state.

After adding the VA-DMA copolymer to the dissolved acrylonitrile terpolymer, agitation and heating as described above are continued until a substantially homogeneous composition or blend has been obtained.

The proportions of the blended solids (i.e., VA-DMA copolymer plus acrylonitrile terpolymer) are generally such that the solution contains from about 5 to about 35, and preferably from about 10 to about 25 or 30 weight percent of the aforementioned solid components of the blend. Solids concentrations within this more limited range, especially at the higher limits of the range, are particularly desirable when the modified terpolymer is to be used in the spinning of filaments or in the casting of films. Good results have been obtained when the aforesaid modified polymer constituted about 20 percent by weight of the solution.

As will be readily understood by those skilled in the art, the aforementioned ranges of concentration are mentioned as indicative of concentrations that may be employed, and the invention is obviously not limited to the use of only such concentrations. Especially in spinning and casting applications, the important factor is that the concentration of the above-described polymeric components in the solvent be such that the viscosity of the liquid composition at the operating temperature is within a workable range.

Satisfactory viscosities at the usual operating temperatures generally prevail when the total polymeric solids in the solution constitute from about 10 to about 25 or 30 weight percent of the solvent (more particularly organic solvent) solution thereof. However, this is dependent upon various influencing factors such as the relative proportions of acrylonitrile terpolymer and of copolymer blending agent in the solution, and the average molecular weights of each of said polymeric components of the blend.

The average molecular weight of the acrylonitrile terpolymer usually exceeds about 10,000, advantageously exceeds about 20,000, and preferably is within the range of from 40,000 or 50,000 to 150,000 or 200,000, or even 250,000 or 300,000 or more, as determined from viscosity measurements and calculations by the Staudinger equation. For some applications it may sometimes be desirable to prepare and use an acrylonitrile polymer having a molecular weight of even 500,000 or 1 million or more (Staudinger method; reference: U.S. Pat. No. 2,404,713).

The average molecular weight of the VA-DMA copolymer is generally at least 10,000, and preferably is of the same general order as that of the acrylonitrile terpolymer.

The inherent viscosity (I.V.) of the acrylonitrile polymeric compositions of this invention, including the acrylonitrile terpolymer modified with the VA-DMA copolymer is at least 0.5, advantageously from about 1 to about 3, and preferably from about 1.0 to about 2.0 as measured in a 0.1 weight percent concentration of the modified terpolymer in dimethylformamide (DMF) at 25° C. The I.V. of some of the unmodified acrylonitrile terpolymers produced and used in practicing this invention, measured in this same manner, has been as high as 3.70 in certain cases.

Because the use of the higher amounts of solvent renders spinning operations more costly and difficult die to the trouble often encountered in rapidly removing large amounts of solvent from the solution, it is preferable to use a VA-DMA-modified acrylonitrile terpolymer wherein the terpolymer component thereof has a molecular weight such that a maximum amount thereof, consistent with the viscosity of the solution at the operating temperature, can be dissolved in the chosen solvent, e.g., an organic solvent such as DMF, dimethylacetamide, dimethylsulfoxide and the like. By using, for example, an acrylonitrile terpolymer having an average molecular weight (Staudinger equation) within the range of from about 40,000 or 45,000 up to about 150,000 or 160,000, it is possible to obtain solutions containing, for instance, from 7 or 8 percent to 25–30 percent by weight of total polymer solids (VA-DMA copolymer plus AN terpolymer), and having suitable viscosities for use at operating temperatures of the order of, for example, 70° C. to 150° C.

The above-described solutions of the VA-DMA modified terpolymers (or corresponding solutions of the unmodified terpolymers) can be used in the production of various fabricated articles or structures such as, for example, films, filaments, bars, rods, tubes, etc., in accordance with general techniques now well known to those skilled in the art, the detailed operating conditions being suitably modified where required. Such technique usually involves extruding the solution containing the acrylonitrile polymeric composition through an opening of predetermined cross section into a liquid nonsolvent for the modified or unmodified acrylonitrile polymer thereby to form a shaped article.

Describing the method of making shaped articles from the solutions (liquid compositions) of this invention more specifically, it may be stated, that in one method of making extruded articles, the solution (advantageously heated to, for instance, 70°–130b$L$ C., after having been previously deaerated and filtered) is extruded through a spinneret or die into a liquid nonsolvent that will coagulate the polymeric solids component of the extrudable composition, more particularly spinning solution. The liquid into which the spinning solution is extruded in one which is miscible with the organic or other solvent component of the solution and which, as a result of extracting the solvent, is capable of coagulating the dissolved polymeric solids. Any liquid which is thus capable of coagulating the aforesaid polymeric solids may be employed, but preferably the liquid coagulant is one that has no harmful effect upon the polymeric component(s).

Thus, when the solvent component of the spinning solution is an organic solvent such as, for example, dimethylacetamide, the liquid coagulant may be, for instance, water or almost any aqueous salt solution, e.g., the alkali-metal (specifically the sodium and potassium) and the ammonium chlorides, bromides, sulfates, nitrates, phosphates, acetates and propionates, as well as water-soluble salts of divalent and trivalent cations, e.g., zinc chloride, calcium chloride, calcium thiocyanate and their obvious equivalents.

The liquid coagulant that is suitable for use with a particular solvent solution of the modified or unmodified AN terpolymer is readily ascertained by checking the literature or by simple experimentation as to those compounds or substances in which the chosen solvent (e.g., organic solvent) component of the spinning solution is soluble at a suitable, operating bath temperature and in which the AN polymeric material in the spinning solution is sufficiently insoluble to permit coagulation thereof in a relatively short period of time.

The temperature of the coagulating or precipitating both may bath may be varied as desired or as conditions may require depending upon the chosen organic or other solvent component of the spinning solution and the chosen liquid coagulant. Generally, the coagulating bath temperature is within the range of from about 0°–10° C. to about 100° C., and is preferably not higher than about 70° or 80° C. in order to minimize discoloration of the coagulated acrylonitrile polymerization product.

It will be understood, of course, by those skilled in the art that the temperature of the liquid coagulating bath (sometimes called a "spin" bath) should be such as to dissolve the solvent from the extruded mass most rapidly and effectively. The length of travel of the shaped article through the bath may be varied as desired or as may be required by the other particular operating conditions. However, in all cases the length of travel should be sufficient to effect solidification of the polymeric acrylonitrile composition and to extract from the extruded mass substantially all of the solvent; or, if desired, extraction of only part of the solvent so that, for example, from 0.5 to 1 percent to 15 or 20 percent or more, by weight of the whole, remains in the extruded mass as a fugitive or permanent plasticizer of the modified or unmodified AN terpolymer.

The spun filamentary material or other extruded article is preferably treated in, or after leaving, the coagulating bath in order to orient the molecules along the fiber axis and thereby to increase the tensile strength and otherwise improve the properties of the spun material. Orientation may be effected by stretching the thread or strand at any suitable stage of the spinning operation but preferably while the spun filament or thread still contains at least some of the solvent. Stretching may be accomplished by passing the thread or yarn between two or more positively driven rolls or godets, the peripheral speeds of which are adjusted so that the thread, yarn, tow or the like is stretched to the desired degree.

The amount of stretch that is applied to the filamentary material may be varied widely, but in all cases should be sufficient to cause appreciable orientation of the molecules along the fiber axis and an improvement in the properties of the material undergoing treatment. The amount of tension to which the filamentary material is subjected should not be so great as to cause it to break (i.e., appreciable or substantial breakage of the individual filaments of the strand or yarn). Depending, for example, upon the type or kind of material being stretched and the particular properties desired in the finished product, the amount of stretch may vary, for instance from 100 percent, preferably from 200 or 300 percent up to 600 or 700 percent or more of the original length of the filamentary material.

The stretch may be applied gradually by passing the strand or the like over a plurality of godets having increasing peripheral speeds. The stretched filamentary material may be wound upon a spool or it may be collected in a centrifugal pot, whereby twist advantageously is applied to the filamentary bundle. Alternatively, the stretched filament material may be led over a thread storage device on which it may be treated with a suitable solvent to remove all or part of the coagulant and/or organic (or aqueous inorganic) solvent component of the spinning solution that may not previously have been removed, after which it may be continuously dried, oiled and taken up on a twisting device such, for instance, as a ring-twisting spindle.

The extruded filamentary material may be given part or all of its total stretch in a liquid medium such as that which constitutes the coagulating bath, or in any other suitable medium, and at a suitable temperature. Thus, the stretch may be applied while the yarn or the like is being passed through a gaseous medium, e.g., air, nitrogen, flue gases, etc., or through a liquid medium, e.g., water, or such media as are employed for coagulating the AN polymeric solids in the spinning solution. To obviate or minimize discoloration of the polymeric component of the spinning solution, the temperature of the medium in which the filamentary material is stretched and its rate of travel therethrough should be adjusted so that overheating of the material does not occur. Ordinarily the temperature of the medium in which stretching is effected is below 200° C., e.g., at 70°– ° C.

The highly stretched product is strong, tough, and pliable, and shows a high degree of orientation along the fiber axis by X-ray diffraction.

Instead of forming a shaped article such as filamentary material by a wet-spinning method as previously has been described, the filamentary material may be produced by dry-spinning technique. This technique is more fully described and illustrated by specific examples directed to dry-spinning of organic solvent solutions of homopolymeric acrylonitrile and copolymers of acrylonitrile, different from the acrylonitrile polymerization products with which this invention is concerned in U.S. patents included in the previously mentioned patent group, viz, 2,404,713–728.

The solvent solutions of the acrylonitrile polymeric compositions of this invention also can be cast in the form of films. For instance, the hot liquid composition may be cast upon a revolving drum which is partly immersed in a coagulating bath, such as was mentioned hereinbefore, and which will serve to deposit the polymer as a thin film on the drum as it passes through the bath. The resulting film may be stretched, if desired, lengthwise and crosswise by suitable, commercially available apparatus to improve its properties.

The cationic dye-receptive AN polymeric compositions of this invention may be dyed with a basic dye while they are still in unshaped form; or, they may first be shaped, e.g., in the form of filamentary material either before or after they have been made into fabrics, clothing, and the like.

In order that those skilled in the art may better understand how the present invention can be carried into effect, the following examples are given by way of illustration and not by way of limitation. All parts and percentages are by weight unless otherwise stated.

Example 1

This example illustrates the preparation of cationic dye-receptive acrylonitrile terpolymers. Details are given for the preparation of a terpolymer of acrylonitrile, dimethylacrylamide and potassium styrene sulfonate. However, the same procedure is also used for the preparation of other AN terpolymers, more particularly polymers of acrylonitrile and potassium styrene sulfonate with, for instance, (a) methacrylonitrile, (b) monoallylether of trimethylolpropane, (c) vinyl versatate, (d) diacetone acrylamide, and (e) vinylidene chloride.

Materials and Quantities

|  | Grams |
|---|---|
| Surfactant solution: | |
| Distilled water | 600 |
| Sodium lauryl sulfate | 7.5 |
| Concentrated $H_2SO_4$ | 0.25 |
| Monomeric mixture: | |
| Acrylonitrile (inhibitor free) | 190.65 (93%*) |
| Dimethylacrylamide (distilled) | 12.30 (6%*) |
| Dye-site monomer solution: | |
| Potassium styrene sulfonate | 2.05 g. (1%*) in 115 ml. $H_2O$ |
| Initiator solutions: | |
| Sodium metabisulfite | 1.70 g. in 100 ml. $H_2O$ |
| Potassium persulfate | 0.85 g. in 100 ml. $H_2O$ |

*Percentage of the total monomers charged.

To the stirred surfactant solution at 45° C. is added 35 ml. of the monomer mixture, 10 ml. of the potassium styrene sulfonate (SSAK) solution, 10 ml. of the sodium metabisulfite solution, and 10 ml. of the potassium persulfate solution. After initiation of copolymerization, as evidenced by the development of a pale blue turbidity in the reaction mass, there is added after every 10-minute interval: 15 ml. of monomer mixture, 7 ml. potassium styrene sulfonate solution, and 6 ml. each of the bisulfite and persulfate solutions. To effect substantial completion of the copolymerization reaction, the reaction mass is heated for an additional one-half hour at 45° C. after all the reaction ingredients have been added to the reactor.

Upon cooling to room temperature (about 25° C.) a small amount of a saturated solution of sodium chloride is added to the reaction mass to insure complete precipitation of the terpolymer. The product, a terpolymer of AN, DMA, and SSAK, is collected by suction filtration and dried in a vacuum oven at 35° C. for about 16 hours. The terpolymer is a white power; yield, 97.5 percent. It has an inherent viscosity of 3.32 as measured in an 0.1 weight percent concentration of the terpolymer in DMF at 25° C.

The yields and inherent viscosities of other terpolymers, prepared in the same manner as described above and in the same weight percentages (based on charge), of AN (93 percent), SSAK (1 percent), and of different dye diffusion-promoting monomers (6 percent in each case) are given below:

| DDP Monomer | Yield percent | I.V. |
|---|---|---|
| (a) Methacrylonitrile | 97.0 | 2.56 |
| (b) Monoallyl ether of trimethylolpropane | 98.0 | 3.39 |
| (c) Vinyl versatate (vinyl neodecanoate) | 99.0 | 2.84 |
| (d) Diacetone acrylamide | 97.5 | 2.54 |

Approximately the theoretical yield is obtained in making a terpolymer, following the procedure described above, of acrylonitrile, (e) vinylidene chloride ($VCl_2$) and SSAK, and wherein the percentages (based on charge), are 85 percent, 14 percent, and 1 percent, respectively. This terpolymer has an I.V. of 2.65 measured as described above.

Example 2

This example illustrates the preparation of a terpolymer of 96 percent AN, 3.5 percent VA and 0.5 percent SSAK (based on charge). The copolymerization is effected under reflux at 80° C.

Materials and Quantities

| Surfactant solution: | |
|---|---|
| Distilled water | 150 g. |
| Abex surfactant* (35.9% active agent) | 12.5 g. |
| Monomeric mixture: | |
| Acrylonitrile (inhibitor free) | 145 g. |
| Vinyl acetate | 5 g. |
| Dye-site monomer solution: | |
| Potassium styrene sulfonate | 0.75 g. |
| Distilled water | 50 ml. |
| Initiator soluton: | |
| Potassium persulfate | 0.5 g. |
| Distilled water | 50 ml. |

*This surfactant is understood to be a nonionic surfactant. It is produced and sold by Alcolac Chemical Corporation, 3440 Fairfield Road, Baltimore 26, Maryland.

To the surfactant solution at 75° C. in a reaction vessel provided with a reflux condenser is added 25 ml. of the monomer mixture, 5 ml. of the potassium persulfate initiator solution. Refluxing of the added monomeric material occurs. After copolymerization has begun there is added, at 15-minute intervals, 20 ml. of the monomer mixture, 3.5 ml. of the dye-site monomer solution and 3.5 ml. of the initiator solution. After the last addition the reaction mixture is maintained at 80° C. under reflux for another 30 minutes to effect substantial completion of the copolymerization reaction.

Upon cooling the reaction mass to room temperature, the product is collected by suction filtration and dried in a vacuum oven at 80 ° C. for 16 hours. The terpolymer is a white powder; yield, 93 percent. It has an inherent viscosity of 2.65 as measured in a 0.1 wt. percent concentration of DMF at 25° C.

Example 3

The six (6) different terpolymers produced as described in example 1 are dissolved in an organic solvent, specifically dimethylacetamide to form liquid compositions as follows:

Individual samples of the dry, white, powdery AN-SSAK terpolymer and wherein the third monomer is one of the following:

A. dimethylacrylamide,
B. methacrylonitrile,
C. monoallyl ether of trimethylolpropane,
D. vinyl neodecanoate,
E. diacetone acrylamide, or
F. vinylidene chloride are dissolved with agitation and heating at about 75° C. in dimethylacetamide in an amount such as will provide a solution containing 20 percent by weight of the terpolymer solids. A control sample containing 20 percent by weight of homopolymeric acrylonitrile dissolved in dimethylacetamide is similarly prepared.

Films, about 10 to 15 mils thick, of the solution of the control sample, and of solutions of the above-described terpolymers, are cast on glass plates. These films are dried in a vacuum oven at a temperature of about 60° C. for about 16 hours, after which they are stripped from the glass substrate. The films of both the control and of the test specimens are clear. They are stripped from the substrate and dyed in a Sevron Blue B (Basic Blue, Color Index Number 21) dye bath containing the following ingredients:

| | |
|---|---|
| Distilled water | 1,800 ml. |
| Sevron Blue B, a cationic dye | 0.90 g. |
| Triton X-102* (surfactant) | 0.90 g. |
| Sodium acetate | 0.30 g. |
| Glacial acetic acid | 0.6 ml. |
| Latyl carrier A** | 9.00 g. |

*Triton is a registered trademark of Rohm and Haas Company, Philadelphia, Pennsylvania. It is octylphenoxy (polyethoxy)-ethanol containing about 10 moles of combined ethylene oxide. **Latyl is a registered trademark of E. I. du Pont de Nemours and Company, Wilmington, Delaware. Latyl carrier A is understood to be a mixture of dimethyl terephthalate and benzanilide.

The films are treated in the hot dye solution for 1 hour at 97° C., then rinsed in a 1 percent green soap solution for another hour at 72°C.

The film of the control sample is unstained. In marked contrast the films of the test samples are dyed varying shades of blue ranging from a medium blue in the case of the film of terpolymer of AN-VCl$_2$-SSAK to much deeper blue shades for the other terpolymer films. The dyed films which contain methacrylonitrile (MAN) and the monoallyl ether of trimethylolpropane (TMPMAE) as the third monomer with an AN and SSAK are lighter in the intensity of their blueness as compared with those wherein the third monomer is dimethylacrylamide, vinyl neodecanoate or diacetone acrylamide. This indicates that MAN and TMPMAE are less efficient as dye-diffusion promoters than are the last three named comonomers in making cationic dye-receptive terpolymers of said comonomers with AN and SSAK. The latter terpolymers are each a dark blue shade with only very slight differences in dye-receptivity (intensity of blue color) between them.

Example 4

A solution of the terpolymer of example 2 that contains, based on charge, 96 percent AN, 3.5 percent VA, and 0.5 percent SSAK is made, and a film is cast therefrom (as well as a control of homopolymeric acrylonitrile) in the same manner as described under example 3.

The films are dried, stripped from the glass substrate, and dyed likewise as set forth in example 3. The film of homopolymeric acrylonitrile is unstained. The film of the terpolymer is dyed a medium or light shade of blue.

Example 5

Example 4 is repeated with the exception that the dimethylacetamide solution is made of a blend of polymers, more particularly a blend of, by weight, 95 percent of the net dry terpolymer of example 2 and 5 percent of a copolymer of vinyl acetate and dimethylacrylamide containing about 22 mole percent of the former and about 78 mole percent of the latter.

Films of this solution are made and dyed in exactly the same manner as in example 4. The film of the VA-DMA modified terpolymer is markedly and unobviously increased in the intensity of its blueness as compared with the film of the unmodified terpolymer of example 4

Example 6

Example 3 is repeated with the exception that solutions of blends of, by weight, 90 percent and 95 percent of the net dry terpolymers and of 10 percent and 5 percent of the VA-DMA copolymer described in example 5 are prepared.

Films of these solutions are made and dyed in exactly the same manner as in example 3. The increases in the intensity of blueness of these dyed films as compared with those of films of the unmodified terpolymers of example 3 are particularly outstanding in those terpolymers having the lowest dye-intensity ratings when tested in unmodified form, namely, terpolymers of AN, SSAK and (a) vinylidene chloride, (b) methacrylonitrile, or (c) the monoallyl ether of trimethylolpropane, and are less marked in the case of the other terpolymers. The increase in the depth of blueness is surprisingly and unobviously outstanding when the comparisons are made with the dyed films of unmodified and VA-DMA modified terpolymer of AN, VCl$_2$, and SSAK.

The individual solutions of the liquid compositions of the invention described in examples 3 through 6 can be wet-spun into 3-denier filaments following the same general procedure described in U.S. Pat. No. 2,615,866. These solutions also can be dry-spun using the apparatus and following the procedure illustrated in example 6 of U.S. Pat. No. 2,821,521. Both the wet-spun and the dry-spun filamentary materials are dyeable with a basic dye, the depth of shade being increased (as indicated in the specific examples) when the terpolymer is modified with a copolymer of vinyl acetate and dimethylacrylamide.

It will be understood, of course, by those skilled in the art that the present invention is not limited only to the particular starting reactants, proportions of reactants and methods of preparation given by way of illustration in the foregoing illustrative examples. Thus, instead of using dimethylacetamide as the organic solvent in making solvent solutions of the terpolymers and of blends thereof with a vinyl acetate-dimethylacrylamide copolymer, one can use dimethylformamide, dimethylsulfoxide, dimethylsulfone, or any other organic solvent, numerous examples of which have been given before. Concentrated aqueous solutions of inorganic salts also can be used as the solvent, e.g. concentrated aqueous solutions of sodium thiocyanate, calcium thiocyanate, lithium nitrate, and other water-soluble metal salts that yield highly hydrated ions in aqueous solution, numerous other examples of which are given in, for instance, U.S. Pat. Nos. 2,140,921 and 2,558,730-735.

Instead of employing vinylidene chloride as a comonomer in making a terpolymer with acrylonitrile and a water-soluble salt of an organic sulfonic acid, specifically the potassium salt of styrenesulfonic acid, one can substitute (wholly or in part) vinylidene bromide or other vinylidene halide. Likewise, other alkali-metal or other water-soluble salts of styrenesulfonic acid, e.g., the sodium salt thereof, can be substituted for the potassium salt of said sulfonic acid in making the acrylonitrile terpolymers. Also, water-soluble salts of other organic sulfonic acids, e.g., vinyl-, allyl- or methallylsulfonic acid; and organic sulfonic acids other than styrenesulfonic acid wherein the sulfo group is separated from the ethylenic unsaturation by at least three carbon atoms, examples of which have been given earlier in this specification, may be employed in place of water-soluble salts of the various styrenesulfonic acids or mixtures thereof.

Ethylenically unsaturated dye-diffusion promoters other than those employed in example 1 can also be employed. Examples of such dye diffusion-promoting copolymerizable comonomers (other than vinyl acetate, methyl acrylate, methacrylamide and N-isooctylacrylamide mentioned earlier in this specification) are vinyl esters of saturated aliphatic monocarboxylic acids other than vinyl acetate and vinyl neodecanoate that have not more than 14, and preferably not more than about 7, carbon atoms in the carboxylic group thereof; alkyl esters of acrylic and methacrylic acids, especially the lower alkyl esters (other than methyl acrylate) of the said acids, e.g., the $C_2$ through $C_6$ alkyl esters of acrylic acid, methacrylic acid and higher members of the homologous series of $\alpha$-alkyl-substituted (e.g., $C_2$ through $C_6$ $\alpha$-alkyl-substituted) acrylic acids. Other examples are, for instance, acrylic acid and the $C_1$ through $C_6$ $\alpha$-alkyl-substituted acrylic acids.

The cationic dye-receptive terpolymers or blends thereof with a copolymer of vinyl acetate and dimethylacrylamide may be modified if desired (for example, when they are to be shaped to form filaments, films, and the like) by incorporating therein any of the additives or modifiers commonly incorporated into such products. Such additives include U.V. absorbers, antioxidants, stabilizers, pigments, plasticizers, fillers, delusterants, e.g., $TiO_2$, and flame retardants. More specific examples of the latter are, for instance, polyvinyl chloride and bromide, polyvinylidene chloride and bromide (especially the chlorides), and which may constitute from 10 to 20 percent by weight of the composition (solids basis). When such flame retardants are employed, then stabilizers for them also are usually included, e.g., organic tin salts such as dibutyl tin laurate. The compositions also may contain auxiliary flame retardants, e.g., $Sb_2O_3$, which can function both as a flame retardant and as a delusterant.

It is to be understood that the foregoing detailed description is given merely by way of illustration and that many variations may be made therein without departing from the spirit and scope of the invention.

The embodiments of the invention in which an exclusive property or privilege is claimed are defined as follows:

1. A composition of matter comprising a blend of (I) an acrylonitrile terpolymer wherein the different copolymerized monomers are of the kind and the different mers thereof are present in the said copolymer in average percentage values, based on the total number of mers from individual monomers employed in making the copolymer, as follows:
   A. from 85 percent to 98 percent acrylonitrile;
   B. from 1 percent to 14.5 percent monoallyl ether of trimethylolpropane; and
   C. from 0.15 percent to about 1 percent of an alkali-metal salt of styrene-sulfonic acid;
and (II) a copolymer of vinyl acetate and N,N-dimethylacrylamide wherein the N,N-dimethylacrylamide constitutes from about 30 percent to about 70 percent by weight of the copolymer of (II); and the amount of the said copolymer that is blended with the acrylonitrile polymer of (I) is within the range of from about 5 percent to about 10 percent, by weight, of the total amount of (I) and (II).

2. A composition as in claim 1 wherein the monomer of B is vinyl neodecanoate instead of the monoallyl ether of trimethylolpropane.

3. A composition as in claim 1 wherein the monomer of B is diacetone acrylamide instead of the monoallyl ether of trimethylolpropane.

4. A cationic dye-receptive acrylonitrile terpolymer wherein the different copolymerized monomers are of the kind and the different mers thereof are present in the said terpolymer in average percentage values, based on the total number of mers from individual monomers employed in making the terpolymer, as follows:
   A. from 85 percent to 98 percent acrylonitrile;
   B. from 1 percent to 14.5 percent of a dye diffusion-promoting, ethylenically unsaturated monomer that is copolymerizable with the other components of the terpolymer, said dye diffusion-promoting monomer being selected from the group consisting of monoallyl ether of trimethylolpropane
   vinyl neodecanoate, and diacetone acrylamide; and C from 0.15 percent to about 1 percent of an alkali-metal salt of styrenesulfonic acid, the total of A, B, and C being 100 percent.

5. A cationic dye-receptive acrylonitrile terpolymer as in claim 8 wherein the dye diffusion-promoting monomer is vinyl neodecanoate.

6. A cationic dye-receptive acrylonitrile terpolymer as in claim 8 wherein the dye diffusion-promoting monomer is diacetone acrylamide.

7. A cationic dye-receptive acrylonitrile terpolymer as in claim 8 wherein the dye diffusion-promoting monomer is the monoallyl ether of trimethylol propane.

8. The composition of claim 4 dissolved in a solvent therefor.

9. The composition of claim 4 in the form of a shaped article.

10. The shaped article of claim 9 dyed with a cationic dye.

11. A composition as in claim 9 wherein the shaped article is filamentary material.

12. A composition as in claim 9 wherein the shaped article is a film.

13. A solution of the composition of claim 4 dissolved in an organic solvent in a concentration of from about 5 percent to about 35 percent by weight of the solution, said solution being adapted to be wet-formed into a cationic, dye-receptive shaped article.

14. The process which comprises preparing a solution as defined in claim 13, and extruding the said solution through an opening of predetermined cross section into a liquid nonsolvent for the solid composition contained in the said solution thereby to form a shaped article.

15. A solution as in claim 14 wherein the organic solvent is N,N-dimethylacetamide.

UNITED STATES PATENT OFFICE
CERTIFICATE OF CORRECTION

Patent No. 3,607,817  Dated September 21, 1971

Inventor(s) Louis E. Trapasso and Charles L. Smart

It is certified that error appears in the above-identified patent and that said Letters Patent are hereby corrected as shown below:

Column 5, line 2, "die" should read -- due --.

Column 5, line 36, "70°-130bL C." should read -- 70°-130°C. --.

Column 5, line 40, "in" should read -- is --.

Column 5, lines 67 and 68, "both may" should be omitted.

Column 6, line 49, "filament" should read -- filamentary --.

Column 6, line 72, "70°- °C." should read -- 70°-140°C. --.

Column 8, line 51, "75°C." should read -- 78°C. --.

Claims 5, 6 and 7, line 2, "8" should read -- 4 --.

Signed and sealed this 13th day of June 1972.

(SEAL)
Attest:

EDWARD M. FLETCHER, JR.　　　　ROBERT GOTTSCHALK
Attesting Officer　　　　　　　　Commissioner of Patents